United States Patent
Krishna et al.

(10) Patent No.: US 7,496,038 B2
(45) Date of Patent: Feb. 24, 2009

(54) METHOD FOR FASTER DETECTION AND RETRANSMISSION OF LOST TCP SEGMENTS

(75) Inventors: Shantala G. Krishna, Karnataka (IN); Uma Krishnan, Austin, TX (US); Kavitha Ramalingam, Karnataka (IN); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 11/301,103

(22) Filed: Dec. 12, 2005

(65) Prior Publication Data

US 2007/0133414 A1  Jun. 14, 2007

(51) Int. Cl.
    *H04J 1/16* (2006.01)
(52) U.S. Cl. .......................... 370/235; 370/394; 370/474
(58) Field of Classification Search .................. None
    See application file for complete search history.

(56) References Cited

U.S. PATENT DOCUMENTS

| 6,201,791 B1 | 3/2001 | Bournas |
| 6,754,228 B1* | 6/2004 | Ludwig ....................... 370/468 |
| 2005/0036511 A1 | 2/2005 | Baratakke et al. |
| 2005/0286527 A1* | 12/2005 | Tieu et al. ................... 370/394 |
| 2006/0002301 A1* | 1/2006 | Liu et al. .................... 370/236 |
| 2006/0126628 A1* | 6/2006 | Li et al. ...................... 370/392 |
| 2007/0280245 A1* | 12/2007 | Rosberg ...................... 370/392 |

OTHER PUBLICATIONS

Allman, et al., TCP Congestion Control, Internet Official Protocol Standards RFC2581, <http://rfc.net/rfc2581.htm>.
Allman, et al., Enhancing TCP's Loss Recovery Using Limited Transit, Internet Official Protocol Standards, RFC3042, <http://rfc.net/rfc3042.htm>.
Floyd, et al., The Newreno Modification to TCP's Fast Recovery Algorithm, Internet Official Protocol Standards, RFC3782, <http://rfc.net/rfc3782.htm>.
Jung, Transmission Control Protocol Express, IBM Technical Disclosure Bulletin, Mar. 1993, pp. 17-20.
TCP Selective Acknowledgement Option (and Related Changes) for FREEBSD, Jun. 20, 2005 <http://info.iet.unipi.it/~luigi/sack.html>.

* cited by examiner

*Primary Examiner*—Firmin Backer
*Assistant Examiner*—Roberta A. Shand
(74) *Attorney, Agent, or Firm*—Dillon & Yudell LLP

(57) ABSTRACT

A method, network receiver and TCP network that enables a receiver-side triggering of the fast retransmit mechanism when a TCP packet/segment is lost or received out-of sequencing order. The receiver is enhanced with a Fast Retransmit Support (FRS) utility that monitors when a next received packet is out-of-order and responds by transmitting a duplicate acknowledgment (ACK) response that includes therein the same window value as the previous ACK. By including the previous clock time, even when the current window value has advanced, the fast retransmit algorithm at the transmitter is triggering before the timeout period.

1 Claim, 4 Drawing Sheets

METHOD FOR FASTER DETECTION AND RETRANSMISSION OF LOST TCP SEGMENTS

BACKGROUND OF THE INVENTION

1. Technical Field

The present invention relates generally to network communication and in particular to network communication via transmission control protocol (TCP). Still more particularly, the present invention relates to a method and system for an improved retransmission mechanism during transmission of TCP packets.

2. Description of the Related Art

Transmission Control Protocol (TCP) is a protocol utilized to transmit data between nodes connected to the Internet. TCP operates as a transport layer protocol in an upper layer for Internet Protocol (IP) operating in a network layer, and is commonly referred to as "TCP/IP." TCP implements a congestion control mechanism using acknowledgement (ACK) information transmitted to acknowledge reception of a data packet.

In TCP communication, data segments are transmitted as packets with unique sequence numbers (or packet IDs) from a transmission/origination terminal to a receiving/destination terminal. When the receiving terminal receives a data segment, the receiving terminal transmits an ACK having the same sequence number as a sequence number of the received data segment. The term "data segment" refers to a unit of a data block transmitted with TCP, referred to as a protocol data unit (PDU). In TCP communication, a transmission terminal simultaneously transmits as many data segments as possible within a period of time, referred to as a congestion window (CWND), even though the transmission terminal may not receive the ACK from a receiving terminal.

If the transmission terminal receives multiple ACKs with the same sequence number, (duplicate ACKs), the transmission terminal retransmits the data segment with the corresponding sequence number. Even through the transmission terminal does not receive the duplicate ACK, if the transmission terminal fails to receive an ACK for a predetermined timeout period after transmitting a data segment to the reception terminal, the transmission terminal retransmits the data segment.

A TCP receiver typically sends an immediate duplicate ACK when an out-of-order segment arrives. The purpose of this ACK is to inform the sender that a segment was received out-of-order and which sequence number is expected. A significant portion of duplicate ACKs are as a result of dropped packets/segments and/or the re-ordering of data segments during transmission through the network.

TCP utilizes a mechanism/algorithm called "Fast Retransmit" (described in IETF rfc2581 available at http://rfc.net/rfc2581.html) to quickly detect and repair loss of packets identified by receipt of incoming duplicate ACKs. Within this algorithm, the receipt of a duplicate ACK is considered an indication of packet loss. The fast retransmit algorithm uses the arrival of 3 duplicate ACKs (4 identical ACKs without the arrival of any other intervening packets) as an indication that a segment has been lost (or reordered). On receiving three such duplicate ACKs, TCP performs a retransmission of what appears to be the missing data segment, without waiting for the retransmission timer to expire.

The Fast Retransmit algorithm is not triggered, however, if enough duplicate ACKs (i.e., 3) are not received within the retransmission timeout period. Thus, there is a particular problem scenario in which the Fast Retransmit algorithm does not get duly triggered, even thought the packet has been lost. An example code of the faulty operation of the fast retransmit algorithm is illustrated by FIG. 1.

FIG. 1 illustrates a basic IP network 100 having a transmitting terminal 110 and a receiving terminal 120 connected to a network 115, such as the Internet. Also illustrated are a series of transmission of data segments across network 115 from transmitter 110 to receiver 120 and transmission of ACK responses from receiver 120 to transmitter 110. The timing of the transmissions is tracked by a vertical timeline 130 with time increasing (0 to T) along the downward path of the timeline. Arrows indicate the direction of each transmission from or to the transmitter and/or receiver, and each ACK transmission is labeled and described as a step in the overall process (e.g., step 140, 145, . . . 160).

As shown by the sequence of ACK responses following the initial transmission of a data segment, because the window information of the receiver 120 has changed (from 32000 to 32500) with the last duplicate ACK (step 155), the transmitter 110 of the data is not able to ascertain whether the duplicate ACK resulted from the receipt of an out-of-order-packet. The transmitter receives the ACK but does not consider the ACK as a duplicate ACK. In many conventional implementations, the timer (counter) is reset to zero (i.e, CNT=0, rather than CNT=2). With this reset, the duplicate ACK tracking process has to start all over again. Thus, for implementations that reset the count to zero, three additional duplicate ACKs are then required to initiate a fast retransmit of the lost packet. Even for implementations that retain the count (CNT=2, in the above example), at least one additional duplicate ACK needs to be received before the retransmission algorithm is triggered to retransmit the data segment. If the transmitter is not in a position to send the required number of new packets (e.g., (a) if there are no more writes from the application that is currently waiting for a response to its request or (b) if TCP is limited by the congestion window), no more duplicate ACKs will be generated and the fast retransmit will not occur.

Several solutions have been proposed to solve the above problems with the fast retransmit algorithm. Among these solutions is the "Limited Transmit" algorithm (described at http://rfc.net/rfc3042.html), which is, however, not specifically designed to solve the problems with the Fast Retransmit algorithm described above. However, event the limited transmit algorithm does not work if the window information changes again (e.g., 32000 to 32500) in the subsequent duplicate ACKs, as typically occurs (per FIG. 1). Notably, limited transmit algorithm and the other proposed solutions all focus on making changes on the transmitter side of the process. Several other transmitter-side solutions are discussed at: http://info.iet.unipi.it/luigi/sack.html. Each such solution suffers from the same limitation as one or both of fast retransmit and limited transmit algorithms.

SUMMARY OF THE INVENTION

Disclosed are a method, network receiver and TCP network that enables a receiver-side triggering of the fast retransmit mechanism when a TCP packet/segment is lost or received out-of sequencing order. The receiver is enhanced with a Fast Retransmit Support (FRS) utility that monitors when a next received packet is out-of-order and responds by transmitting a duplicate acknowledgment (ACK) response that includes therein the same window value as the previous ACK. By including the previous clock time, even when the current window value has advanced, the fast retransmit algorithm at the transmitter is triggering before the timeout period.

Accordingly, each time the data receiver receives an out-of-order packet, the data receiver sends a duplicate ACK response acknowledging the data received in full to that point. In one embodiment, the data receiver stores a copy of the first duplicate ACK with the same window value as the previous ACK. Following, even if the receiving window expands (e.g. when the application reads the next "out-of-order" packet data in the receiving window), the data receiver does not utilize the updated window value when issuing the ACK to the data transmitter. Rather, the data receiver sends the stored duplicate ACK, which advertises the previous/stored window value (i.e., same as within the previous ACK). The transmitter therefore reads the duplicate ACK as a true duplicate and increases its counter by 1.

Once a threshold number of duplicate ACKs (e.g., 3) are received at the transmitter, the transmitter activates the fast retransmit algorithm, which causes the lost packet (identified by the duplicate ACKs) to be retransmitted. The transmitter then resets the counter to zero to begin a new count of duplicate ACKs. On receipt of this packet by the data receiver, the data receiver generates a new ACK with the updated window value and sends that new ACK on the network. The counter for the fast retransmit algorithm is reset within the data transmitter when a new window value is received within an ACK before the counter reaches the preset threshold.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method, network receiver and TCP network that enables a receiver-side triggering of the fast retransmit mechanism when a TCP packet/segment is lost or received out-of sequencing order. The receiver is enhanced with a Fast Retransmit Support (FRS) utility that monitors when a next received packet is out-of-order and responds by transmitting a duplicate acknowledgment (ACK) response that includes therein the same window value as the previous ACK. By including the previous clock time, even when the current window value has advanced, the fast retransmit algorithm at the transmitter is triggering before the timeout period.

Figure 1:
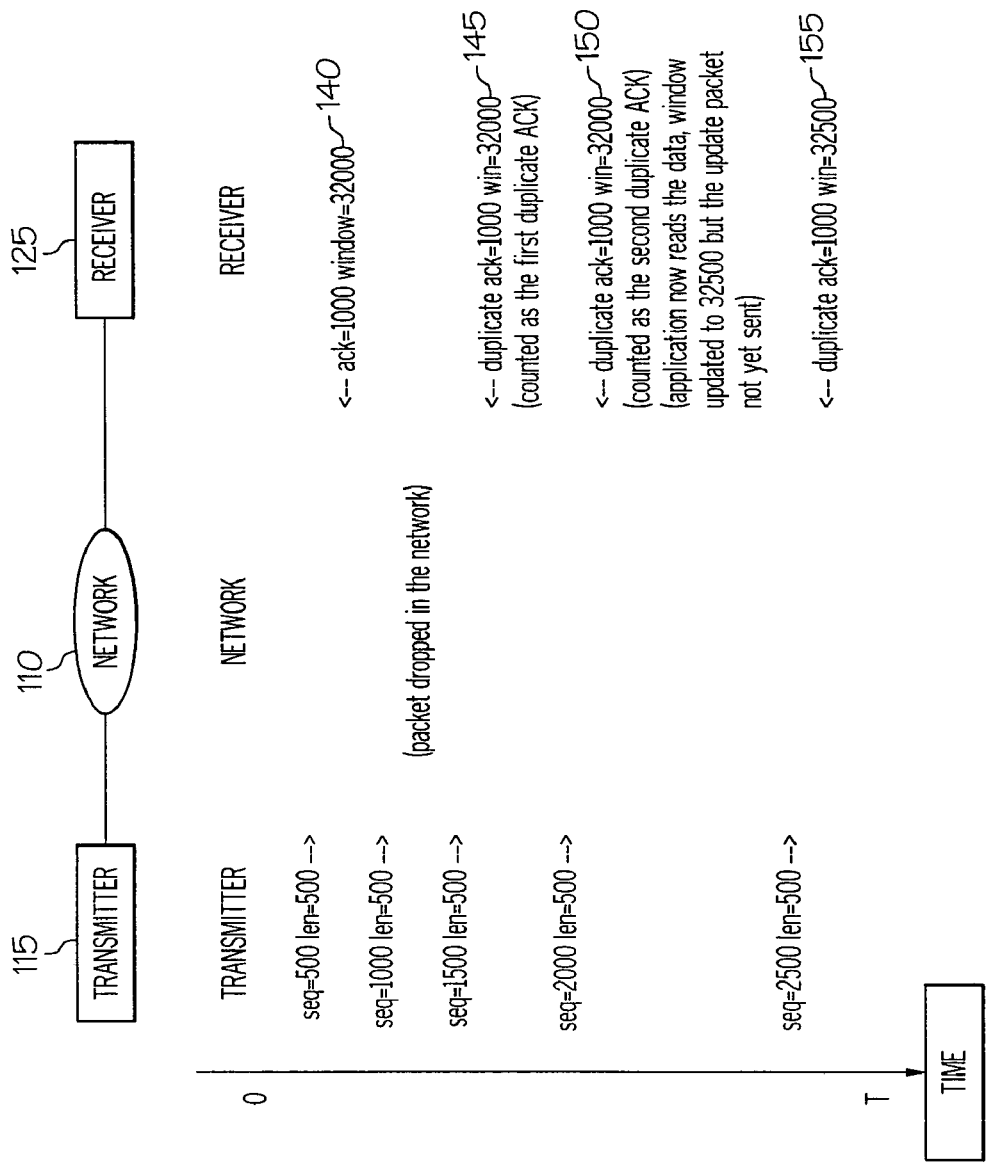
FIG. 1 illustrates a prior art exchange of data segments and ACKs between a transmitter and conventional receiver.
Figure 2:
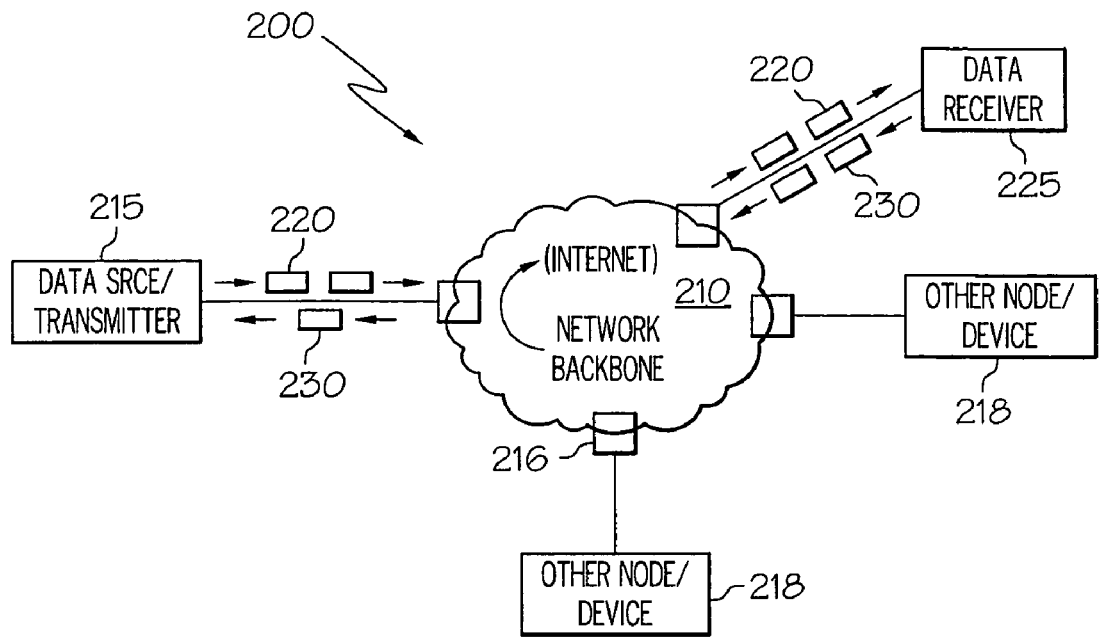
FIG. 2 illustrates an example of a data network within which features of the present invention may advantageously be implemented.

With reference now to the figures and in particular with reference to FIG. 2, there is illustrated a sample network within which features of the invention may be advantageously implemented. Network 200 comprises a network backbone 210 illustrated as a network cloud. According to the described embodiments, network 200 transmits data packets (or segments) utilizing Transmission Control Protocol (TCP), and network 200 is a TCP/IP (Internet Protocol) network, such as the Internet. Connected to network backbone 210 (via routers or gateways 216, for example) are data transmitter 215 from which data packets 220 are generated and transmitted and data receiver 225 which receives and processes the received data packets 220. Data transmitter 215 may also be referred to herein as an originating terminal/node, while data receiver 225 may be referred to as a receiving terminal. On receipt of data packets 220, data receiver 225 generates an ACK response packet (referred to herein as an ACK) that is transmitted to data transmitter 215. According to the disclosed embodiment, data transmitter 215 includes a fast retransmission algorithm and responds to receipt of ACKs and specifically a pre-set number of duplicate ACKs in one of several ways, described below.

Figure 6A:
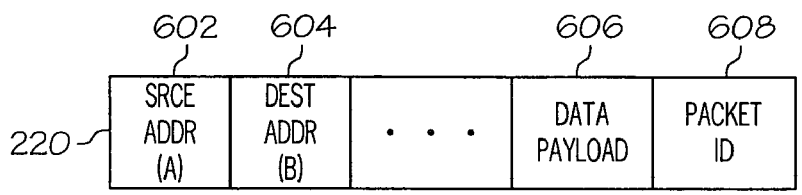
FIGS. 6A and 6B are timeline diagrams illustrating the transmission of data packets/segments and response ACKs between a data transmitter and an enhanced data receiver according to one embodiment of the invention.
Figure 6B:
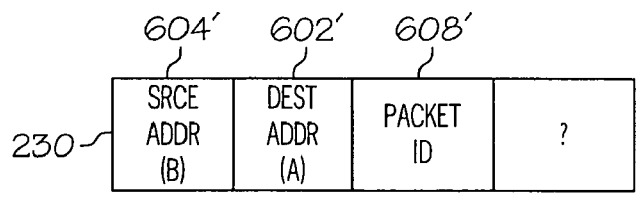

FIG. 6A illustrates an example data packet, while FIG. 6B illustrates an example ACK. Data packet 600 comprises a number of sections, including: (1) a header section with origination address 604, destination address 606, type 608, sequencing number (or packet ID) 610; and (2) data payload 612. ACK 620 includes at least window value 622 and sequencing number 624, which corresponds to the sequencing number for the last packet received in order at the receiver. Both data packet 600 and ACK 620 are provided for illustration only and not meant to impose any limitations on the invention.

Figure 3:
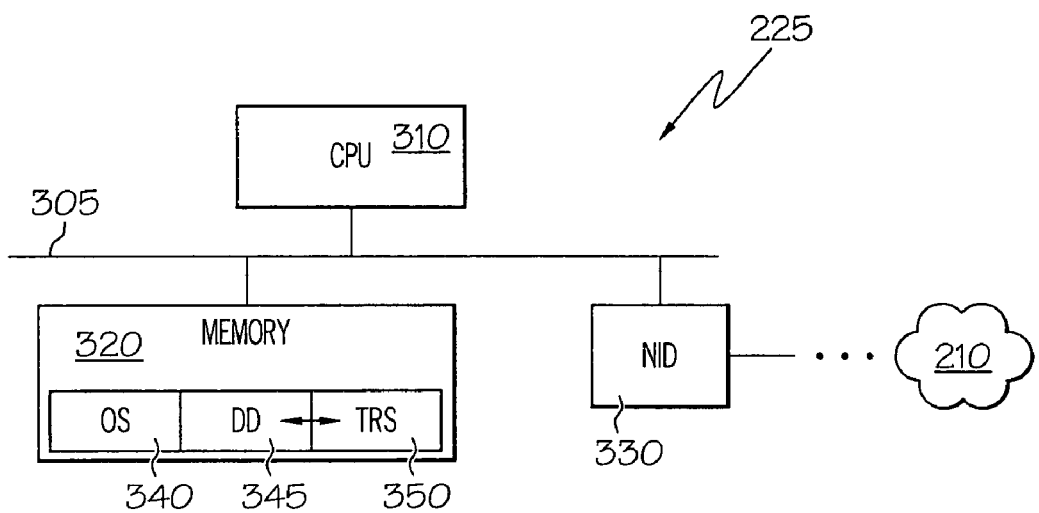
FIG. 3 is a block diagram of an example computer system utilized as a data receiver according to one embodiment of the invention.

Unlike conventional implementation, data receiver 225 is designed with additional functionality that enables data receiver 225 to generate duplicate ACKs without changing a previous window value, thus avoiding a false reset of the duplicate ACK counter at the data transmitter 215. FIG. 3 illustrates primary components of a computer system that is utilized as data receiver 225 within the description of the present invention. As illustrated, data receiver 225 includes processor 310, which is coupled to memory 320 and network interface device (NID) 330 via system interconnect 305. NID 330 provides interconnectivity to an external network through a gateway or router, etc. NID 330 may be an Ethernet card or modem, for example, depending on the type of network to which the data receiver 225 is connected. Other components (not specifically illustrated) may be provided within data receiver, such as input/output devices and other peripheral devices. The illustration is thus not meant to imply any structural or other functional limitations on data receiver 225 and is provided solely for illustration and description herein.

In addition to the above described hardware components of data receiver 225, several software and firmware components are also provided within data receiver 225 to enable the hardware devices to provide the basic functionality associated with a data receiver as well as the added functionality of generating identical duplicate ACKs to trigger a faster retransmit, as described herein. Among these software/firmware components are operating system (OS) 340, NID driver 345, and Fast Retransmit Support (FRS) algorithm/utility 350. Since the functionality associated with FRS utility 350 is directly related to network transmission via NID 330, FRS utility 350 is illustrated as linked (or associated) with the NID driver 345. When executed by processor 310 during receipt of data packets, FRS utility 350 implements an algorithm (at data receiver) that provides the various functions described below, with reference to FIGS. 4 and 5.

Several key enhancements that enable the functionality of the present invention are made within data receiver 225 (via "FRS algorithm/utility executing therein). Each time the data receiver 225 receives an out-of-order packet, data receiver 225 issues a duplicate ACK acknowledging the data received in full up to that point. The data receiver then stores a copy of the ACK including the current window value. In one embodiment, the data receiver stores a copy of the first duplicate ACK with the same window value as the previous ACK. Following, even if the receiving window expands (e.g. when the application reads the next "out-of-order" packet data in the receiving window), the data receiver does not utilize the updated window value when issuing the ACK to (advertise to) the data transmitter. Rather, the data receiver sends the stored duplicate ACK, which advertises the previous/stored window value (i.e., same as within the previous ACK). The transmitter therefore reads the duplicate ACK as a true duplicate and increases its counter by 1.

Once a threshold number of duplicate ACKs (e.g., 3) are received at the transmitter 215, the transmitter 215 activates the fast retransmit algorithm, which causes the lost packet (identified by the duplicate ACKs) to be retransmitted. The transmitter 215 then resets the counter to zero to begin anew count of duplicate ACKs. On receipt of this packet by the data receiver, the data receiver 225 generates a new ACK with the updated window value and sends that new ACK on the network. The counter for the fast retransmit algorithm is reset within the data transmitter 225 when a new window value is received within an ACK before the counter reaches the preset threshold.

From the network view, the FRS utility temporarily freezes the forward progress of the receiver's window even though the window actually advances when the out-of-order packet is read at the receiver. The receiver then only updates the window value within the ACK being issued once the "lost" or "missing" packet arrives at the receiver. The processing functionality of the FRS utility prevents the receiver from sending a window update within a duplicate ACK that is generated and sent to signal receipt of a packet that is out-of-order, relative to the previous in-order packet. This then enables the fast retransmit algorithm to be triggered at the transmitting end.

Figure 4:
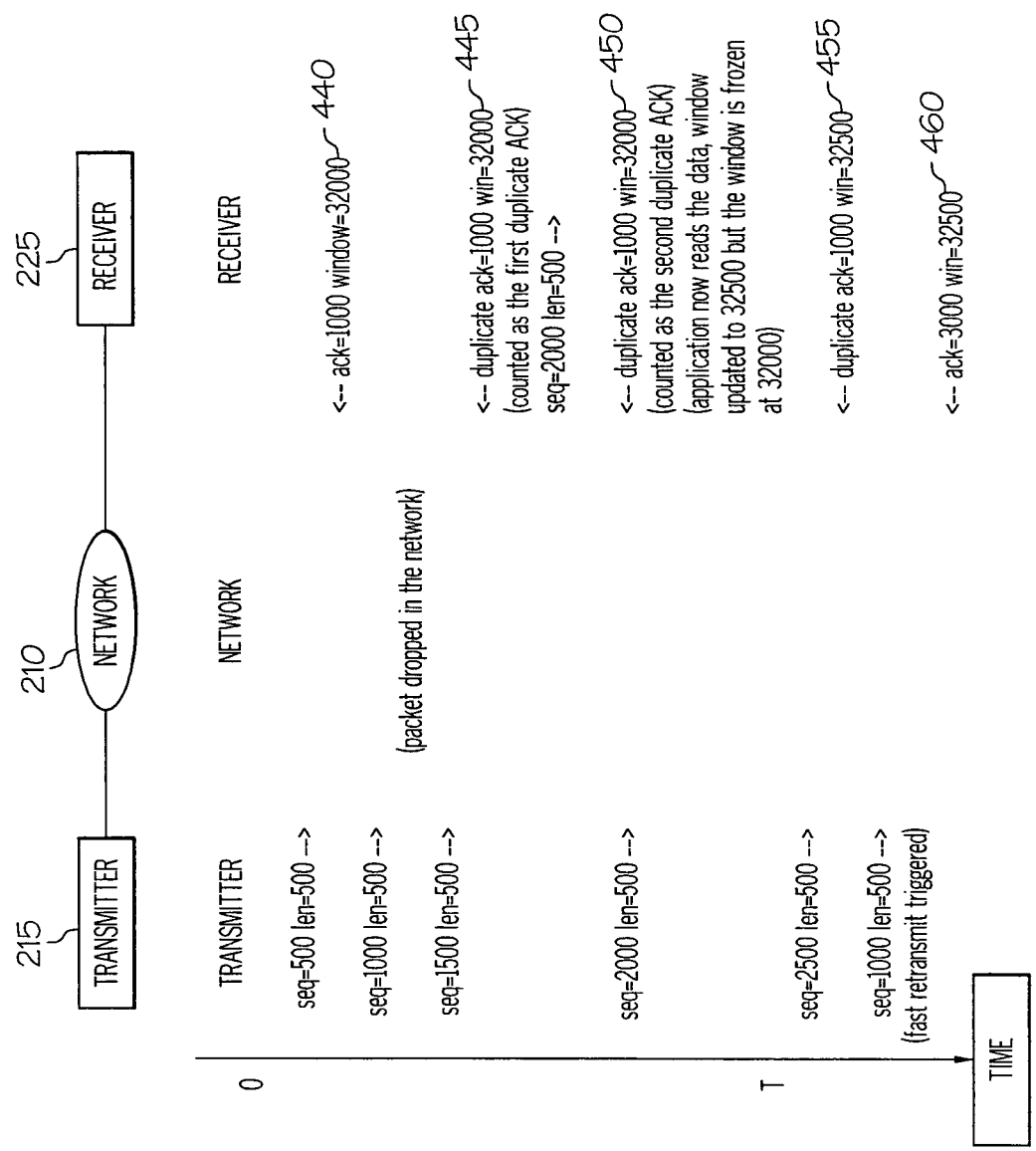
FIG. 4 is a block diagram respectively representing a data packet and an ACK response packet as described within embodiments of the invention.

FIG. 4 illustrates an example process of exchange of data segments and ACKs between data transmitter 210 and data receiver 225. Basic IP network 200 comprises data transmitter 210 and data receiver 225 connected to a network backbone 215, such as the Internet. Also illustrated are a series of data packets/segments transmitting across network backbone 215 from data transmitter 210 to data receiver 225 and ACK responses transmitting from data receiver 225 to data transmitter 210. The timing of the transmissions is tracked by a vertical timeline with time increasing (0 to T) along the downward path of the timeline. Arrows indicate the direction of each transmission from or to data transmitter 210 and/or data receiver 220, and each ACK transmission is labeled and described as a next step in the duplicate ACK transmission process (e.g., step 440, 445, . . . 460).

Each packet includes a sequencing number and each ACK includes both a sequencing number corresponding to one of the packet sequencing number and a window value. Packet length (e.g., 500) refers to the sequencing number of the packet. Also, as shown, the window value (32000) within each duplicate ACK remains the same until three duplicate ACKs have been issued. This occurs even though the actual window value may have increased to 32500 before the second and/or third duplicate ACKs was issued.

Figure 5:
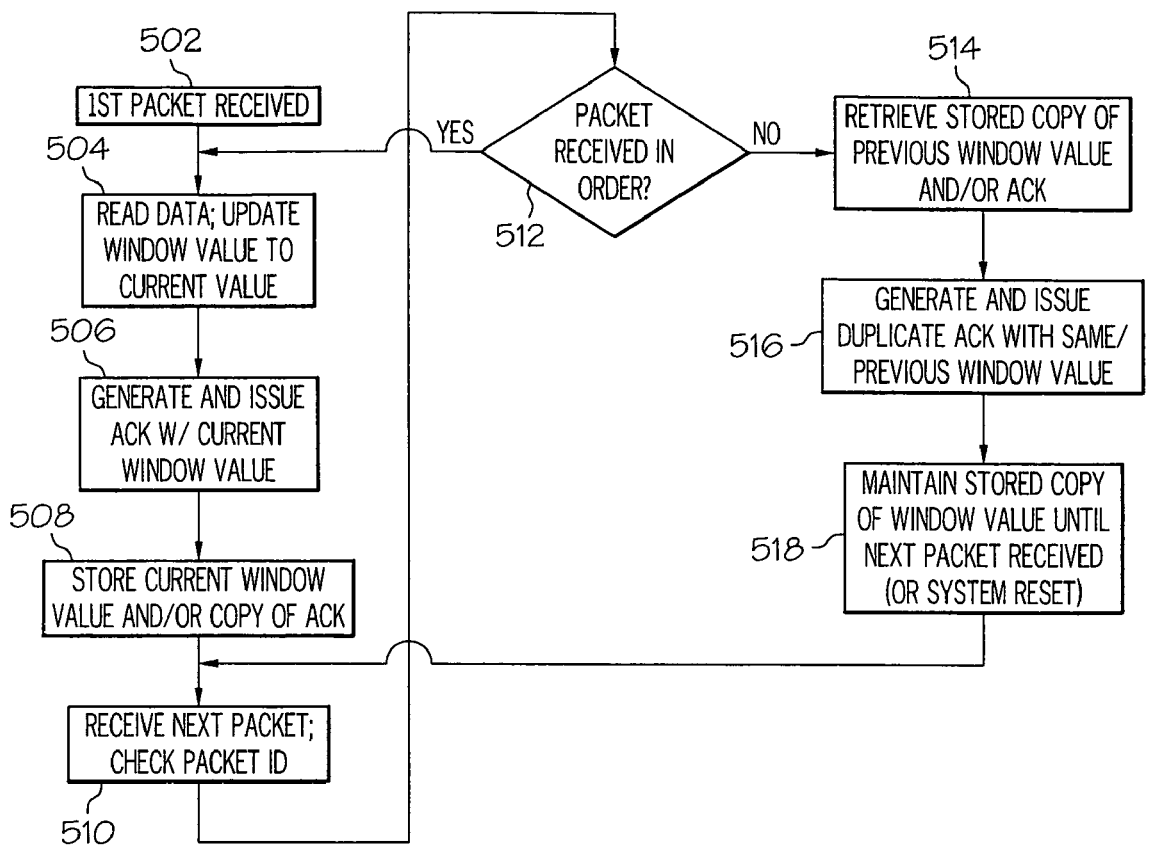
FIG. 5 is a flow chart illustrating the processes undertaken by the enhanced data receiver in triggering an early fast retransmit of a lost data packet according to one embodiment of the invention.

FIG. 5 is a flow chart describing the processing that occurs at the data receiver end of the transmission. Each block number, placed within parentheses, indicates one of the process steps undertaken by FRS utility in managing correct window numbering when out-of-order receipt of packets (e.g., for lost packets) occurs. The process begins when data receiver receives a first data segment in the transmission (block 502). Data receiver reads the data and sets the window value using a current value, which is illustrated "W=32000" (block 504). Data receiver then generates an ACK, places the current window value (W=32000) within the ACK and sends the ACK to the data transmitter identified within the header portion of the data segment (block 506). Data receiver also stores the current window value in memory (block 508).

When data receiver receives a next data packet (block 510), data receiver checks at block 512 whether the data segment was received in-order relative to the previous data segment received (identified by the sequential ordering tags within the data header). Before generating a new ACK, the data receiver checks the stored value of the window and if the value is a null value or a "startup/initial" value and the received packet is out of order, the data receiver utilizes the stored value. If the data segment is received in correct sequencing order, data receiver processes the data and updates the current window value (e.g., W-32,500) (block 514). Then, data receiver generates an ACK tagged with the newly generated window value, W=32500 (block 516). This effectively resets the timeout counter within the transmitter.

If, however, the received data segment was out-of-order, data receiver either (a) copies the previously stored ACK with previous window value or generates a new ACK with the previous window value (block 514). Data receiver then sends that ACK to the data transmitted (block 516). That is, data receiver sends a duplicate ACK, i.e., an ACK having the same window value and packet ID. The process of sending a duplicate ACK continues until the data transmitted retransmits/resends another copy of the lost data packet and the retransmitted data packet is received at the receiver. The data receiver 225 maintains the stored copy of the window value (or the last duplicate ACK) until a correct packet is received to the data receiver is reset (block 518). Once a correct packet is received, the data receiver resumes generation of new ACKs with the current window value. In one embodiment, the data receiver may also include an error detection mechanism that tracks the number of duplicate ACKs issued and sends out an error in transmission message/signal to the transmitter when a preset threshold of duplicate ACKs are received (e.g., 6 duplicates ACKs) within a timeout period.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. In a network communication device, a method comprising:
   receiving a second data segment from an originating device;
   determining whether the second data segment is received in correct sequence order relative to a previously received first data segment; and
   when the second data segment is not received in correct sequence order relative to the previously received first data segment, providing an acknowledgement (ACK) response comprising a repeated window value that corresponds to a clock value recorded at the time of receipt of the first data segment, wherein said providing comprise generating the ACK response utilizing the stored clock value as the window value included within the response;
   issuing the acknowledgement (ACK) response with the repeated window value to the network, wherein the originating device is made aware that the data segment issued sequentially after the first data segment was not received by the network communication device and the originating device is triggered to activate and/or update a Fast Retransmit protocol;
   updating the window value to a current clock time when the second data segment is received in correct sequence order relative to the previously received first data segment;
   generating the ACK response with a current window value that corresponds to a clock value recorded at the present time of receipt of the second data segment to indicate that the second data segment was received in correct sequencing order;
   issuing the ACK response to the network;
   storing a first clock value recorded at the time of receipt of the first data segment within a storage facility of the network communication device;
   updating the stored first clock value with a more recent second clock value when the second data segment is received in correct sequence order, wherein the first clock value of the receiving device is updated to the more recent clock value;
   maintaining the stored first clock value within the storage facility when the second data segment is not received in correct sequence order, wherein said maintaining is completed even when the current clock value of the receiving device is updated to account for receipt of the second data segment;
   storing a first ACK response having a first clock value recorded at the time of receipt of the first data segment within a storage facility of the network communication device;
   generating a new ACK response comprising a second clock value corresponding to when the second data segment is received in correct sequence order;
   wherein said issuing comprises re-issuing the first ACK response after receipt of the second data segment out of order sequencing order relative to the first data segment; and
   wherein subsequent to said generating the new ACK response:
      storing the new ACK response within the storage facility of the network communication device; and
      determining when to re-issue the new ACK response or generate a subsequent ACK response based on whether the subsequently received data segment is received in correct sequencing order relative to the last data segment received in correct sequencing order.

* * * * *